Patented Feb. 26, 1952

2,587,278

UNITED STATES PATENT OFFICE 2,587,278

INCREASING THE MECHANICAL STABILITY OF FORMALDEHYDE-PRESERVED NATURAL RUBBER LATEX

Edward M. Bevilacqua, Ramsey, N. J., assignor to United States Rubber Company, New York, N. Y., a corporation of New Jersey No Drawing. Application February 2, 1950, Serial No. 142,081

20 Claims. (Cl. 260—820)

This invention relates to increasing the mechanical stability of formaldehyde-preserved natural rubber latex.

Natural Hevea rubber latex is commonly preserved today with ammonia. It is also known to preserve latex with formaldehyde, and this has the advantage that the solid rubber derived from formaldehyde-preserved latex is much softer than the rubber derived from ammonia-preserved latex, and this is desirable in many manufacturing processes. Rubber from ammonia-preserved latex has a Mooney viscosity of around 115 to 160, and rubber from formaldehyde-preserved latex has a Mooney viscosity of around 58 to 69, as measured at 100° C. by the Mooney shearing disc plastometer described by M. Mooney in Industrial and Engineering Chemistry, Anal. Ed. 6, 147 (1934). However, such formaldehyde-preserved latex thickens rapidly with age, and in a few months becomes too thick for direct use in manufacturing processes. Volatile secondary and tertiary amines have been added to formaldehyde-preserved latex to prevent this thickening on ageing, and to give a formaldehyde-preserved latex which will remain fluid over a long period of time. However, there is still a serious disadvantage to the use of such latices in manufacturing processes because of their very low mechanical stability. The mechanical stability of formaldehyde-preserved latices, including those where there has also been added a volatile amine to maintain the requisite fluidity over a long period of time, is much lower than the mechanical stability of ammonia-preserved latices, and is too low for many commercial usages. Some conventional surface-active agents will effectively increase the mechanical stability of formaldehyde-preserved latices when used in amounts of 1% or more, but they are ineffective at low concentrations, as up to 0.2%. Other conventional surface-active agents will coagulate formaldehyde-preserved latices when used in amounts of 1% or more. All percentages and parts referred to herein are by weight. Such large amounts as 1% of added surface-active agents which will increase the mechanical stability of the latex are commercially impractical, and may impart various difficulties to the use of the latex in manufacturing operations and introduce undesirable properties to the final rubber products made from the latex.

The object of the present invention is to increase effectively the mechanical stability of formaldehyde-preserved latex without adding more than 0.2% by weight of a material based on the latex. The terms "natural rubber latex" and "latex" are used herein to designate the latex of the *Hevea brasiliensis* tree, and unless otherwise specified include normal and concentrated *Hevea brasiliensis* latex.

According to the present invention, the mechanical stability of formaldehyde-preserved latex is effectively increased by incorporating in the latex a small amount of polyvinyl methyl ether or polyvinyl methoxyethyl ether or copolymer of vinyl methyl ether and vinyl methoxyethyl ether.

In carrying out the present invention, 0.01% to 0.2%, based on the latex of polyvinyl methyl ether or polyvinyl methoxyethyl ether or a copolymer of vinyl methyl ether and vinyl methoxyethyl ether is incorporated in the formaldehyde-preserved latex, which may be normal or concentrated. The amount of formaldehyde that is added to the freshly tapped latex may be from 0.1 to 1%. The addition of the formaldehyde to the freshly tapped latex reduces the pH from about 7 to a value in the range 5.5 to 6.8 depending on the amount of formaldehyde used. The formaldehyde is distributed throughout the serum of the uncoagulated latex, and on removal of serum in the concentration of the latex as by centrifuging or chemical creaming, the formaldehyde content of the cream may be lowered to as little as 0.03%. Further formaldehyde may be added to the concentrated latex if desired. For increasing the fluidity of the latex on standing, it is sometimes desirable to also add 0.1 to 1%, based on the latex, of a volatile, saturated, secondary or tertiary amine, e. g., dimethylamine, trimethylamine, or morpholine. Such volatile amine may be added to the unconcentrated or concentrated latex, or may be added both before and after concentration. The pH of such latices containing about 0.03 to 1% of formaldehyde and 0.1 to 1% of volatile secondary or tertiary amine will generally be in the range of 6 to 10.5. Such volatile secondary and tertiary amines do not react in the latex with the formaldehyde as do ammonia or primary amines, and hence the latices retain the desirable property of yielding the low viscosity rubber, of Mooney 58 to 69 characteristic of formaldehyde-preserved latices, although they are still low in mechanical stability. On the other hand, the preservation of latex by the addition of formaldehyde and ammonia in amount in excess of that required to react with the formaldehyde, as in U. S. Patent 1,872,161, gives a latex of high mechanical stability, but such a latex is essentially an ammonia-preserved latex and the rubber has the usual high Mooney viscosity of around 115 to 160.

The polyvinyl methyl ether or polyvinyl methoxyethyl ether or copolymer of vinyl methyl ether and vinyl methoxyethyl ether may be added to the latex at the plantations when the latex is initially treated with formaldehyde, with or without a volatile secondary or tertiary amine, or the vinyl ether polymer or copolymer may be added to such formaldehyde-preserved latex after preservation and before shipment from the plantations, or it may be added to the formaldehyde-preserved latex after arrival in the country to which it is exported. If the latex is to be concentrated, the vinyl ether polymer or copolymer will generally be added after concentration to prevent waste of the material. The formaldehyde-preserved latex, which may or may not contain additional volatile secondary or tertiary amine, will have sufficient mechanical stability to withstand shipment, but it should have its mechanical stability effectively increased for use in manufacturing processes. The addition to the latex of up to 0.2% of the vinyl ether polymer or copolymer has no significant effect on properties of the latex other than effectively to increase its mechanical stability. The viscosity of the latex is not notably affected, and coagulation of the latex by salt or by acid is not hindered. Cured films of rubber made from the latex are indistinguishable from those made without addition of the vinyl ether polymer or copolymer. Intrinsic viscosities are used to distinguish or compare such vinyl ether polymers or copolymers of different molecular weights. Such polyvinyl ether polymers and copolymers having intrinsic viscosities in the range 0.05 to 0.6 may be used in the present invention.

In the work to be described below illustrating the invention, the mechanical stability of the latices was measured by the method described in "Examination of Rubber Latex and Rubber Latex Compounds" by Jordan, Brass and Roe, Ind. & Eng. Chem. 9, 182–198, the particular test for "Mechanical Stability" being found on pages 188 and 189. In the mechanical stability determinations, fifty milliliters of latex in a jacketed stainless steel vessel 3.8 cm. square were stirred with a propeller blade driven by a high speed Hamilton Beach motor running at 18,000 R. P. M. The temperature was kept at 25° C. Stabilities are reported in seconds, this being the number of seconds to coagulation as described in the Jordan, Brass and Roe publication. Ammonia-preserved latices, including those latices to which there is added formaldehyde and an excess of ammonia over that required to react with the formaldehyde as in U. S. Patent 1,872,161, have mechanical stabilities greater than 400 seconds. It is not necessary to increase the mechanical stabilities of such latices.

Example I

A latex was preserved in Malaya by adding 0.15% of formaldehyde and 0.3% of dimethylamine, based on the latex, followed shortly by centrifuging, and then adding a further 0.3% of dimethylamine, based on the concentrated latex, giving a concentrated latex containing about 0.05% of formaldehyde and 0.4% of dimethylamine. The centrifuged latex as imported into the United States had a solids content of 63.5%, a pH of 8.5, and a mechanical stability of 120 seconds. The addition to separate portions of the concentrated latex of 0.01, 0.02, 0.03, 0.04, 0.05, 0.07, and 0.10% of a polyvinyl methyl ether having an intrinsic viscosity in water of 0.16, increased the mechanical stability to 225, 380, 505, 660, 875, 1655 and more than 1800 seconds, respectively. A different polyvinyl methyl ether having an intrinsic viscosity in water of 0.16 increased the mechanical stability to 245, 475, and 970 seconds, respectively, at concentrations of 0.02, 0.05, and 0.10% based on the concentrated latex. The addition to the concentrated latex of 0.05% of a polyvinyl methoxyethyl ether having an intrinsic viscosity in water of 0.09, increased the mechanical stability to 387 seconds. The addition to the concentrated latex of 0.05% of a copolymer of 90% of vinyl methyl ether and 10% of vinyl methoxyethyl ether having an intrinsic viscosity in water of 0.12 increased the mechanical stability, to 720 seconds. The addition to the concentrated latex of 0.05% of a copolymer of 50% vinyl methyl ether and 50% of vinyl methoxyethyl ether having an intrinsic viscosity in water of 0.12 increased the mechanical stability to 402 seconds.

Example II

A latex preserved in Malaya with 0.4% of formaldehyde was imported into the United States where it was found to have a solids concentration of 37.3%, a pH of 5.8, and a mechanical stability of 70 seconds. The addition to the latex of 0.05% of a polyvinyl methyl ether having an intrinsic viscosity in water of 0.16 increased the mechanical stability to 360 seconds.

Example III

A latex preserved in Malaya with 0.4% of formaldehyde and 0.2% of trimethylamine was imported into the United States where it was found to have a solids concentration of 40.1%, a pH of 7.0, and a mechanical stability of 272 seconds. The addition to the latex of 0.05% of polyvinyl methoxyethyl ether having an intrinsic viscosity in water of 0.09 increased the mechanical stability to 597 seconds. The addition to the latex of 0.05% of a copolymer of 50% vinyl methyl ether and 50% vinyl methoxyethyl ether having an intrinsic viscosity in water of 0.12 increased the mechanical stability to 473 seconds.

Example IV

A latex was preserved in Malaya with 0.4% of formaldehyde and 0.3% of morpholine. It was imported into the United States where it was centrifuged, giving a solids concentration of 61.5%, a pH of 6.4, and a mechanical stability of 34 seconds. The addition to the concentrated latex of 0.05% of a polyvinyl methyl ether having an intrinsic viscosity in water of 0.16 increased the mechanical stability to 250 seconds. The addition to the concentrated latex of 0.05% of a polyvinyl methoxyethyl ether having an intrinsic viscosity in water of 0.09 increased the mechanical stability to 452 seconds.

Example V

A latex was preserved in Malaya with 0.15% of formaldehyde and 0.3% of morpholine, and was then centrifuged. To the centrifuged product were added 0.3% of formaldehyde and 0.3% of morpholine, and the concentrate was imported into the United States where it was found to have a solids concentration of 63.6%, a pH of 6.7, and a mechanical stability of 88 seconds. The addition to the concentrated latex of 0.05% of a polyvinyl methyl ether having an intrinsic viscosity in water of 0.16 increased the mechanical stability to 545 seconds. The addition of 0.05% of a different polyvinyl methyl ether having an intrinsic viscosity in water of 0.16 increased the mechanical stability of the latex to 457 seconds. The addition to separate portions of the concentrated latex of 0.05% of different polyvinyl methyl ethers having intrinsic viscosities in water of 0.20, 0.43 and 0.40 increased the mechanical stabilities of the latex to 355 seconds, 394 seconds and 434 seconds respectively. The addition to the concentrated latex of 0.05% of a copolymer of 50% of vinyl methyl ether and 50% of vinyl methoxyethyl ether having an intrinsic viscosity in water of 0.12 increased the mechanical stability to 552 seconds.

*Example VI*

A latex was preserved in Malaya with 0.4% of formaldehyde and 0.2% of dimethylamine, based on the latex. It was imported into the United States where it was centrifuged, followed by addition of .05% of dimethylamine based on the concentrated latex. The concentrated latex had a pH of 7.5, a solids concentration of 63.6%, and a mechanical stability of 36 seconds. The addition to the concentrated latex of 0.05% of a polyvinyl methyl ether having an intrinsic viscosity in water of 0.16 increased the mechanical stability to 160 seconds.

*Example VII*

A latex was preserved in Malaya with 0.15% of formaldehyde and 0.2% of dimethylamine, based on the latex, followed shortly by centrifuging and then adding a further 0.1% of formaldehyde and 0.2% of dimethylamine, based on the concentrated latex. The latex concentrated was imported into the United States where it was found to have a solids concentration of 63.0%, a pH of 9.4, and a mechanical stability of 460 seconds. The addition to the concentrated latex, of 0.05% of a polyvinyl methyl ether having an intrinsic viscosity in water of 0.16 increased the mechanical stability to 1000 seconds.

*Example VIII*

A latex was preserved in Malaya with 0.4% of formaldehyde and 0.2% of trimethylamine. It was imported into the United States where it was centrifuged, followed by addition of 0.12% of trimethylamine, based on the concentrated latex. The concentrated latex had a pH of 8.5, a solids concentration of 60.5%, and a mechanical stability of 55 seconds. The addition to the concentrated latex, of 0.05% of a polyvinyl methyl ether having an intrinsic viscosity in water of 0.16 increased the mechanical stability to 395 seconds.

As shown in the above examples, small amounts of polyvinyl methyl ethers, polyvinyl methoxyethyl ether, and copolymers of vinyl methyl ether and vinyl methoxyethyl ether such as those having intrinsic viscosities in water in the range of 0.05 to 0.6, will greatly increase the mechanical stability of formaldehyde preserved latices. As these materials precipitate in water at elevated temperatures e. g. at temperatures over 37° C. for polyvinyl methyl ether and at temperatures over 66° C. for polyvinyl methoxyethyl ether, this should be considered in selecting the vinyl ether polymer or copolymer to be used if it is desired to maintain the increase in mechanical stability of the formaldehyde-preserved latex at temperatures above room temperature, e. g. at temperatures over 35° C.

In general, conventional anionic, cationic or non-ionic surface-active agents containing long chain hydrophobic groups do not effectively increase the mechanical stability of formaldehyde-preserved latices when added in the small amounts (0.01 to 0.2% based on the latex) used with the vinyl ether polymers and copolymers according to the present invention. For example, 0.05% of the following surface-active agents containing hydrophobic groups, when added to the latex of Example I, gave mechanical stabilities of less than 200 seconds, which shows the ineffectiveness of such surface-active agents to raise the mechanical stability as compared with the vinyl ether polymers and copolymers of the present invention: dioctyl ester of sodium sulfosuccinic acid, sodium sulfate derivative of 7-ethyl-2-methyl-undecanol-4,

alkyl naphthalene sodium sulfonates, condensation product of formaldehyde with sodium naphthalene sulfonate, stearyl dimethyl benzyl ammonium chloride, benzyl triethyl ammonium chloride, nonaethylene glycol oleate and laurate and stearate, mono- and polyesters of sorbitan and long chain fatty acids, e. g., sorbitan monolaurate and monooleate and monostearate, and sorbitan trioleate and tristearate, reaction products of ethylene oxide with such mono- and polyesters of sorbitan and long chain fatty acids, condensation products of ethylene oxide with oleic acid and with oleyl alcohol and with tall oil acids.

The vinyl ether polymers and copolymers of the present invention, however, do increase the mechanical stability of formaldehyde-preserved latices to which small amounts of such surface-active agents containing a long chain hydrophobic group have been added, which amounts of themselves will not increase the mechanical stability of the latex. This is shown in the following example:

*Example IX*

The addition to the concentrated latex of Example I, which had a mechanical stability of 120 seconds, of 0.1% of a condensation product of formaldehyde with sodium naphthalene sulfonate gave a mechanical stability of 113 seconds. The further addition to the thus treated latex of 0.05% of a polyvinyl methyl ether having an intrinsic viscosity in water of 0.16 increased the mechanical stability from 113 to 650 seconds.

The addition of polyvinyl methyl ether to ammonia-preserved latices, including those preserved with formaldehyde followed by an excess of ammonia, has the opposite effect to its addition to formaldehyde preserved latices as shown above, and in fact decreases the mechanical stability. This is shown in the following example:

*Example X*

An ammonia-preserved latex concentrated by creaming with ammonium alginate and containing 0.65% of ammonia on the concentrate was prepared in Malaya. It was imported into the United States where it was found to have a solids concentration of 68.0%, the pH of 10.2, and the mechanical stability of 460 seconds. The addition to the concentrated latex of 0.05% of polyvinyl methyl ether having an intrinsic viscosity in water of 0.16 reduced the mechanical stability to 345 seconds.

A latex was preserved in Malaya with 0.2% formaldehyde, followed after 12 hours by the addition of 0.2% excess of ammonia over that necessary to react with the formaldehyde to form hexamethylenetetramine. The latex was then centrifuged and the ammonia content was raised to 0.65% based on the concentrated latex. It was imported into the United States where it was found to have a pH of 10.3, a concentration of 63.4% solids, and a mechanical stability of 900 seconds. The addition to the concentrated latex 0.05% of a polyvinyl methyl ether having an intrinsic viscosity in water of 0.16 reduced the mechanical stability to 530 seconds.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of increasing the mechanical stability of formaldehyde-preserved natural Hevea rubber latex which comprises incorporating in the latex 0.01 to 0.2% of material selected from the group consisting of polyvinyl methyl ether, polyvinyl methoxyethyl ether, and copolymers of vinyl methyl ether and vinyl methoxyethyl ether, said material having an intrinsic viscosity in water in the range of 0.05 to 0.6, and the latex being at a temperature not over 66° C. and at which said material is water soluble.

2. The method of increasing the mechanical stability of formaldehyde-preserved natural Hevea rubber latex which comprises incorporating in the latex 0.01 to 0.2% of material selected from the group consisting of polyvinyl methyl ether, polyvinyl methoxyethyl ether, and copolymers of vinyl methyl ether and vinyl methoxyethyl ether, said material having an intrinsic viscosity in water in the range of 0.05 to 0.6, and the temperature of said latex being not over 35° C.

3. The method of increasing the mechanical stability of natural Hevea rubber latex containing 0.03 to 1% of formaldehyde based on the latex which comprises incorporating in said latex 0.01 to 0.2% of material selected from the group consisting of polyvinyl methyl ether, polyvinyl methoxyethyl ether, and copolymers of vinyl methyl ether and vinyl methoxyethyl ether, said material having an intrinsic viscosity in water in the range of 0.05 to 0.6, and the temperature of said latex being not over 35° C.

4. The method of increasing the mechanical stability of natural Hevea rubber latex containing 0.03 to 1% each of formaldehyde and an amine of the group consisting of dimethylamine, trimethylamine, diethylamine, triethylamine, and morpholine which comprises incorporating in said latex 0.01 to 0.2% of material selected from the group consisting of polyvinyl methyl ether, polyvinyl methoxyethyl ether, and copolymers of vinyl methyl ether and vinyl methoxyethyl ether, said material having an intrinsic viscosity in water in the range of 0.05 to 0.6, and the latex being at a temperature not over 66° C. and at which said material is water soluble.

5. The method of increasing the mechanical stability of formaldehyde-preserved natural Hevea rubber latex which comprises incorporating in the latex 0.01 to 0.2% of polyvinyl methyl ether having an intrinsic viscosity in water in the range of 0.05 to 0.6, and the temperature of said latex being not over 35° C.

6. The method of increasing the mechanical stability of formaldehyde-preserved natural Hevea rubber latex which comprises incorporating in the latex 0.01 to 0.2% of a copolymer of vinyl methyl ether and vinyl methoxyethyl ether having an intrinsic viscosity in water of 0.05 to 0.6, the latex being at a temperature not over 66° C. and at which said copolymer is water soluble.

7. The method of increasing the mechanical stability of natural Hevea rubber latex containing 0.03 to 1% of formaldehyde based on the latex which comprises incorporating in said latex 0.01 to 0.2% of polyvinyl methyl ether having an intrinsic viscosity in water in the range of 0.05 to 0.6, the temperature of said latex being not over 35° C.

8. The method of increasing the mechanical stability of natural Hevea rubber latex containing 0.03 to 1% of formaldehyde based on the latex which comprises incorporating in the latex 0.01 to 0.2% of a copolymer of vinyl methyl ether and vinyl methoxyethyl ether having an intrinsic viscosity in water in the range of 0.05 to 0.6, the temperature of said latex being not over 35° C.

9. The method of increasing the mechanical stability of formaldehyde-preserved natural Hevea rubber latex which comprises incorporating in the latex 0.01 to 0.2% of polyvinyl methoxyethyl ether having an intrinsic viscosity in water in the range of 0.05 to 0.6, and the temperature of said latex being not over 66° C.

10. The method of increasing the mechanical stability of natural Hevea rubber latex containing 0.03 to 1% of formaldehyde based on the latex which comprises incorporating in said latex 0.01 to 0.2% of polyvinyl methoxyethyl ether having an intrinsic viscosity in water in the range of 0.05 to 0.6, the temperature of said latex being not over 35° C.

11. A formaldehyde-preserved natural Hevea rubber latex containing 0.01 to 0.2% of material selected from the group consisting of polyvinyl methyl ether, polyvinyl methoxyethyl ether, and copolymers of vinyl methyl ether and vinyl methoxyethyl ether, said material having an intrinsic viscosity in water in the range of 0.05 to 0.6, and the latex being at a temperature not over 66° C. and at which said material is water soluble.

12. A formaldehyde-preserved natural Hevea rubber latex containing 0.01 to 0.2% of material selected from the group consisting of polyvinyl methyl ether, polyvinyl methoxyethyl ether, and copolymers of vinyl methyl ether and vinyl methoxyethyl ether, said material having an intrinsic viscosity in water in the range of 0.05 to 0.6, and the temperature of said latex being not over 35° C.

13. A natural Hevea rubber latex containing 0.03 to 1% of formaldehyde and 0.01 to 0.2% of material selected from the group consisting of polyvinyl methyl ether, polyvinyl methoxyethyl ether, and copolymers of vinyl methyl ether and vinyl methoxyethyl ether, said material having an intrinsic viscosity in water in the range of 0.05 to 0.6, and the temperature of said latex being not over 35° C.

14. A natural Hevea rubber latex containing 0.03 to 1% of formaldehyde, 0.1 to 1% of an amine of the group consisting of dimethylamine, trimethylamine, diethylamine, triethylamine, and morpholine; and 0.01 to 0.2% of material selected from the group consisting of polyvinyl methyl ether, polyvinyl methoxyethyl ether, and copolymers of vinyl methyl ether and vinyl methoxyethyl ether, said material having an intrinsic viscosity in water in the range of 0.05 to 0.6, and the latex being at a temperature not over 66° C. and at which said material is water soluble.

15. A formaldehyde-preserved natural Hevea rubber latex containing 0.01 to 0.2% of polyvinyl methyl ether having an intrinsic viscosity in water in the range of 0.05 to 0.6, and the temperature of said latex being not over 35° C.

16. A formaldehyde-preserved natural Hevea rubber latex containing 0.01 to 0.2% of a copolymer of vinyl methyl ether and vinyl methoxyethyl ether having an intrinsic viscosity in water of 0.05 to 0.6, the latex being at a temperature not over 66° C. and at which said copolymer is water soluble.

17. A natural Hevea rubber latex containing 0.03 to 1% of formaldehyde and 0.01 to 0.2% of polyvinyl methyl ether having an intrinsic viscosity in water in the range of 0.05 to 0.6, the temperature of said latex being not over 35° C.

18. A natural Hevea rubber latex containing 0.03 to 1% of formaldehyde and 0.01 to 0.2% of a copolymer of vinyl methyl ether and vinyl methoxyethyl ether having an intrinsic viscosity in water in the range of 0.05 to 0.6, the temperature of said latex being not over 35° C.

19. A formaldehyde-preserved natural Hevea rubber latex containing 0.01 to 0.2% of polyvinyl methoxyethyl ether having an intrinsic viscosity in water in the range of 0.05 to 0.6, and the temperature of said latex being not over 66° C.

20. A natural Hevea rubber latex containing 0.03 to 1% of formaldehyde and 0.01 to 0.2% of polyvinyl methoxyethyl ether having an intrinsic viscosity in water in the range of 0.05 to 0.6, the temperature of said latex being not over 35° C.

EDWARD M. BEVILACQUA.

REFERENCES CITED

The following references are of record in the file of this patent:

UNITED STATES PATENTS

| Number | Name | Date |
| --- | --- | --- |
| 1,872,161 | McGavack | Aug. 16, 1932 |
| 2,216,233 | Dreyling | Oct. 1, 1940 |
| 2,327,115 | Linscott | Aug. 17, 1943 |
| 2,359,667 | Ogilby | Oct. 3, 1944 |

FOREIGN PATENTS

| Number | Country | Date |
| --- | --- | --- |
| 788,987 | France | Oct. 21, 1935 |